(12) United States Patent
Gottwald et al.

(10) Patent No.: US 8,687,962 B2
(45) Date of Patent: Apr. 1, 2014

(54) METHOD AND ARRANGEMENT FOR TRANSMITTING SIGNALS IN A POINT TO MULTIPOINT NETWORK

(75) Inventors: Erich Gottwald, Holzkirchen (DE); Sylvia Smolorz, Munich (DE)

(73) Assignee: Xieon Networks S.a.r.l., Luxemburg (LU)

( * ) Notice: Subject to any disclaimer, the term of this patent is extended or adjusted under 35 U.S.C. 154(b) by 161 days.

(21) Appl. No.: 13/173,077

(22) Filed: Jun. 30, 2011

(65) Prior Publication Data

US 2011/0262131 A1    Oct. 27, 2011

Related U.S. Application Data

(63) Continuation of application No. PCT/EP2008/068353, filed on Dec. 30, 2008.

(51) Int. Cl.
*H04J 14/02* (2006.01)

(52) U.S. Cl.
USPC ............ 398/69; 398/70; 398/71; 398/72

(58) Field of Classification Search
USPC .................................................. 398/66–73
See application file for complete search history.

(56) References Cited

U.S. PATENT DOCUMENTS

| | | | |
|---|---|---|---|
| 5,126,871 A | 6/1992 | Jeffers | |
| 5,222,103 A | 6/1993 | Gross | |
| 5,272,556 A * | 12/1993 | Faulkner et al. | 398/71 |
| 5,696,614 A * | 12/1997 | Ishikawa et al. | 398/81 |
| 5,987,040 A * | 11/1999 | Nesset et al. | 372/8 |

(Continued)

FOREIGN PATENT DOCUMENTS

| | | |
|---|---|---|
| EP | 0428151 A2 | 5/1991 |
| EP | 0898390 A2 | 2/1999 |

(Continued)

OTHER PUBLICATIONS

Takano et al.: "Experimental Demonstration of Optically Phase-Shifted SSB Modulation with Fiber-Based Optical Hilbert Transformers", Optical Fiber Communication and The National Fiber Optic Engineers Conference, 2007, OCF/NFOE 2007, Mar. 25, 2007, pp. 1-3 XP009123881.

(Continued)

*Primary Examiner* — Shi K Li
*Assistant Examiner* — Tanya Motsinger
(74) *Attorney, Agent, or Firm* — Nelson Mullins Riley & Scarborough LLP

(57) ABSTRACT

Bidirectional data signals are exchanged between a central unit and a plurality of network terminals. The optical carrier frequencies of the downstream and upstream signals are chosen so that reflections do not interfere with the selected signal at the optical network unit and not with the received upstream signals at the central unit. The optical network units select their associated downstream signal and generate an associated upstream signal.

24 Claims, 10 Drawing Sheets

(56) References Cited

U.S. PATENT DOCUMENTS

| | | | |
|---|---|---|---|
| 6,021,236 | A | 2/2000 | Schmuck |
| 6,151,145 | A | 11/2000 | Srivastava et al. |
| 6,243,176 | B1 | 6/2001 | Ishikawa et al. |
| 6,529,649 | B1* | 3/2003 | Soole ............................. 385/14 |
| 7,003,226 | B2* | 2/2006 | Sakamoto et al. .............. 398/79 |
| 7,440,701 | B2 | 10/2008 | Li et al. |
| 7,599,620 | B2 | 10/2009 | Graves et al. |
| 8,320,760 | B1* | 11/2012 | Lam et al. ....................... 398/66 |
| 2005/0078963 | A1 | 4/2005 | Lenosky |
| 2007/0014579 | A1 | 1/2007 | Buchali |
| 2007/0189769 | A1* | 8/2007 | Mauro et al. .................... 398/66 |
| 2009/0067843 | A1* | 3/2009 | Way et al. ....................... 398/79 |
| 2010/0046945 | A1* | 2/2010 | Lee et al. ........................ 398/68 |
| 2010/0111543 | A1 | 5/2010 | Chow et al. |
| 2011/0229135 | A1* | 9/2011 | Gottwald ........................ 398/58 |

FOREIGN PATENT DOCUMENTS

| | | |
|---|---|---|
| EP | 12632258 A2 | 12/2002 |
| EP | 1744476 A1 | 1/2007 |
| WO | 2007070200 A2 | 6/2007 |
| WO | 2008111034 A1 | 9/2008 |

OTHER PUBLICATIONS

Feldman et al:, "Broadband Upgrade of an Operating Narrowband Single-Fiber Passive Optical Network Using Coarse Wavelength Division Multiplexing and Subcarrier Multiple Access", Journal of Lightwave Technology, IEEE Service Center, New York, NY, US, vol. 16, No. 1, Jan. 1, 1988, XP011029013.

* cited by examiner

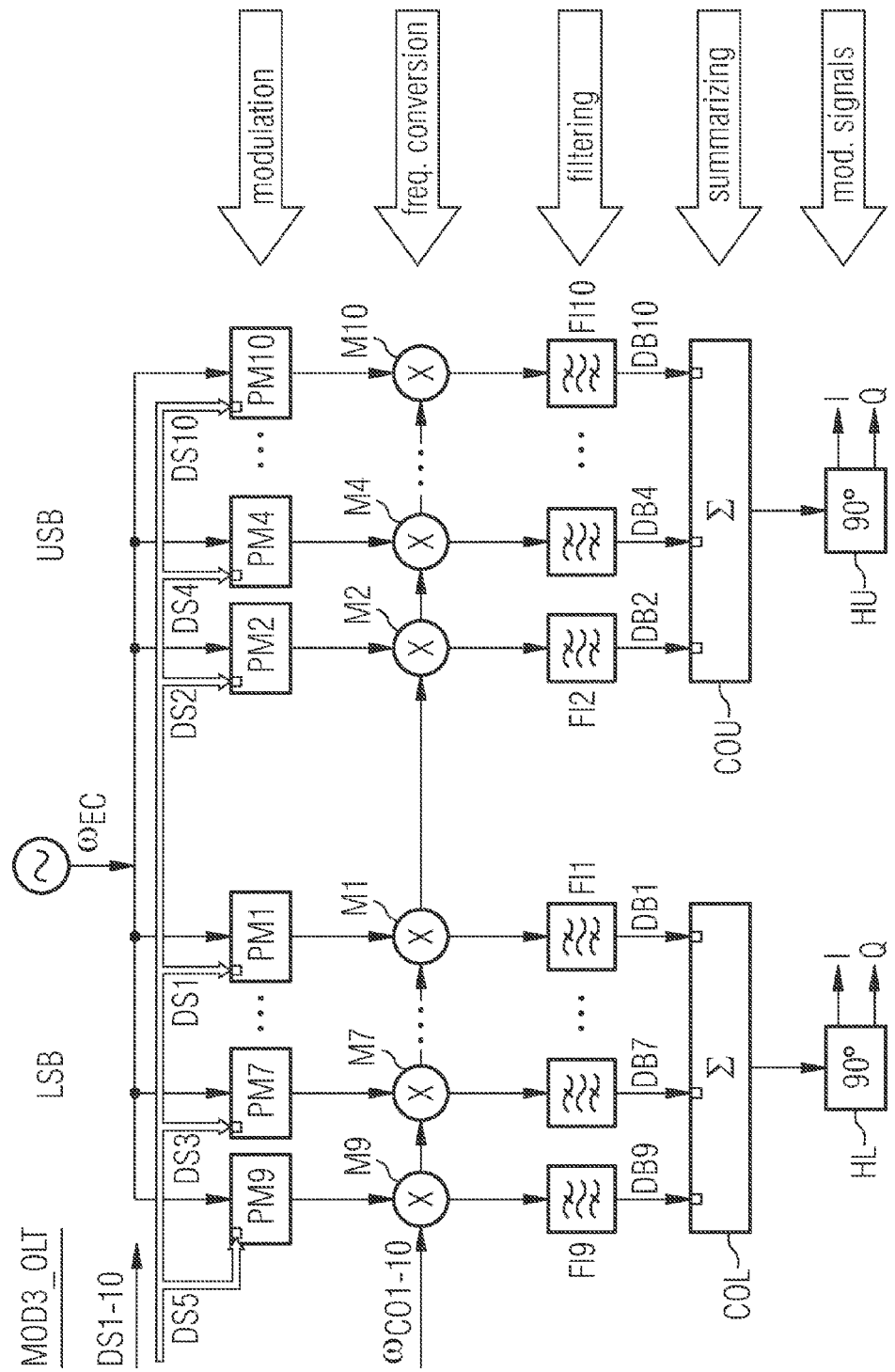

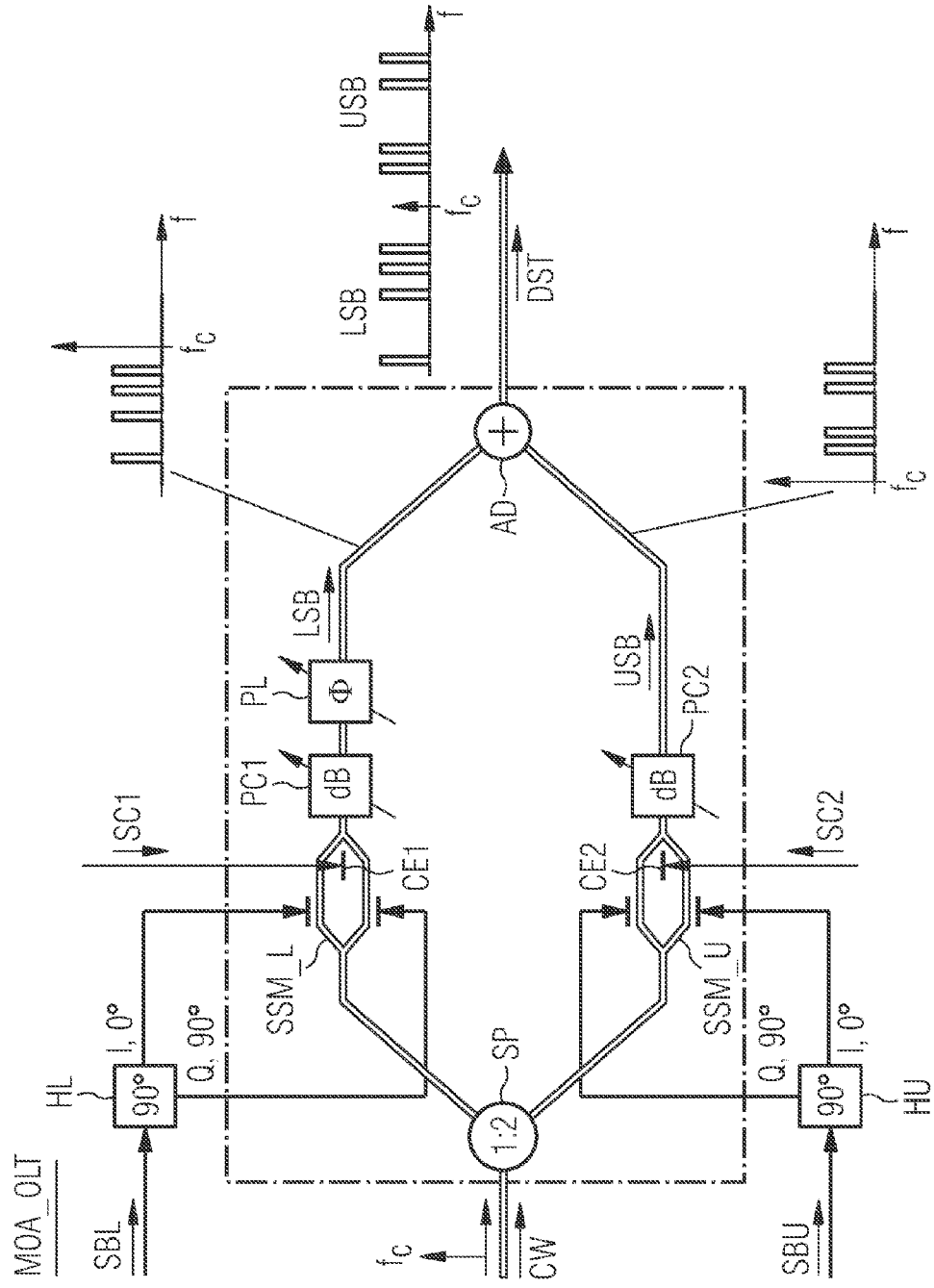

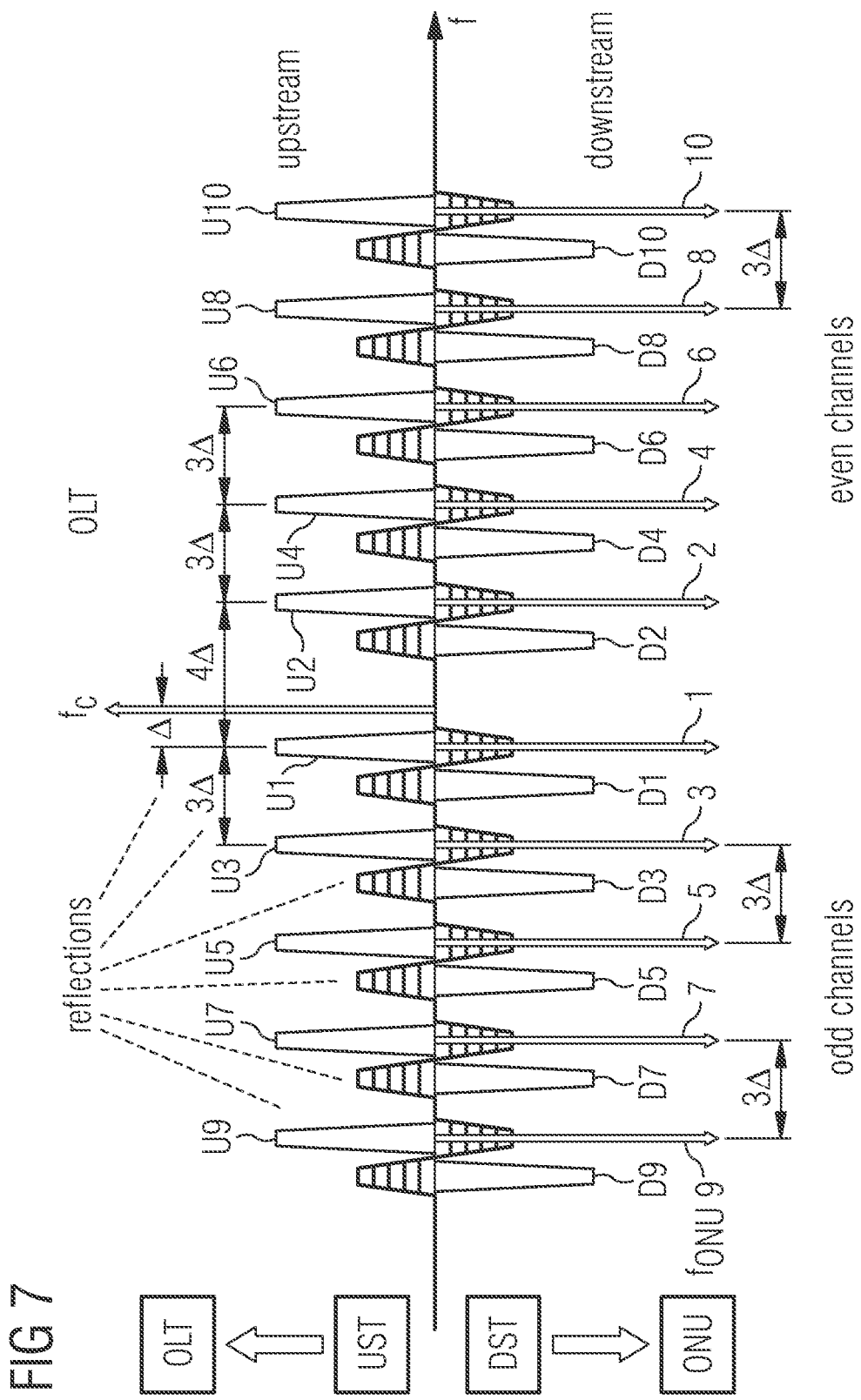

METHOD AND ARRANGEMENT FOR TRANSMITTING SIGNALS IN A POINT TO MULTIPOINT NETWORK

CROSS-REFERENCE TO RELATED APPLICATION

This application is a continuation, under 35 U.S.C. §120, of copending international application No. PCT/EP2008/068353, filed Dec. 30, 2008, which designated the United States; the prior application is herewith incorporated by reference in its entirety.

BACKGROUND OF THE INVENTION

Field of the Invention

The invention refers to a method and an arrangement for transmitting optical downstream signals and optical upstream signals via a single optical fiber in a point to multipoint network between a central unit and a plurality of network units.

Point to multipoint communication networks e.g. passive optical networks (PONS) comprise a central unit (OLT) and optical network units (ONUs) connected via optical fibers. Data signals are usually transmitted as time diversity multiplex (TDM) signals in downstream direction from the OLT to the ONUs and in the upstream direction as time multiplexed burst signals from the ONUs to the OLT. Time division multiplex transmission in the downstream direction and burst mode transmission in the upstream direction require a complex time management, and the burst mode transmission results in lower data rates.

U.S. Pat. No. 5,222,103 describes a quadrature phase shift keying encoder for subcarrier systems. This invention features a differential QPSK digital communications apparatus and method, suitable for optical communications systems, where a pair of synchronous binary input data streams $S_O(t)$ and $S_1(t)$ (cf. U.S. Pat. No. 5,222,103; FIG. 1) are encoded into a pair of encoded binary data streams $d_O(t)$ and $d_1(t)$ which QPSK modulate the phase $\phi(t)$ of a microwave subcarrier signal. An optical modulator modulates a plurality of QPSK modulated microwave subcarrier signals onto an optical carrier signal (U.S. Pat. No. 5,222,103; FIG. 3); an optical detector detects the modulated subcarrier from the optical carrier signal to produce a detected subcarrier signal, and a QPSK demodulator recovers $S_O(t)$ and $S_1(t)$ from the detected subcarrier signal.

An optical double sideband signal has only a low spectral efficiency.

Katsumi Takano, N. Hanzawa, S. Tanji, and K. Nakagawa describe in "Experimental Demonstration of Optically Phase-Shifted SSB Modulation with Fiber-Based Optical Hilbert Transformers", National Fiber Optic Engineers Conference, OSA Technical Digest Series (CD) (Optical Society of America, 2007), paper JThA48, an optically phase shifted SSB (Single Side Band) modulation using a third-order optical Hilbert transformer with Mach-Zehnder interferometers. This arrangement is applicable for high speed transmission with good bandwidth efficiency. This document shows also an SSB transmitter electrically generating phase shifted SSB signals. Any kind of modulation arrangement capable for SSB modulation may be used in the present invention.

SUMMARY OF THE INVENTION

It is accordingly an object of the invention to provide a method and a configuration for transmitting signals in a point to multipoint network which overcome the above-mentioned disadvantages of the heretofore-known devices and methods of this general type and which provides for a point to multipoint network for bidirectional data transmission with high data rates in both directions and at reasonable costs.

With the foregoing and other objects in view there is provided, in accordance with the invention, a method for transmitting optical downstream signals and optical upstream signals via a single optical fiber in a point to multipoint network between a central unit and a plurality of network units, the method which comprises:

generating an optical downstream transmission signal formed of downstream signals with a channel spacing of $2n\Delta$, where $n=2, 3, 4, \ldots$, and $\Delta$ is a minimum channel spacing, between two adjacent downstream signals and a channel spacing of $3\Delta$ between all other adjoining downstream signals.

According to the present invention, there is provided a method for transmitting optical downstream signals and optical upstream signals via a single optical fiber in a point to multipoint network between a central unit and a plurality of network units. The novel method is characterized by generating an optical single sideband downstream transmission signal comprising the downstream signals with a frequency distance of $2n\Delta$ ($n=2, 3, 4, \ldots$) between two adjacent downstream signals and a channel spacing of $3\Delta$ between all other adjoining downstream signals. The term delta ($\Delta$) represents a minimum channel spacing.

It is advantageous when the two adjacent downstream signals are generated with a frequency distance of $4\Delta$.

It is advantageous that an optical carrier signal is generated for signal processing in the central unit with a carrier frequency situated between the carrier frequencies of the two adjacent downstream signals, which are characterized by the frequency distance of $4\Delta$, and with a frequency distance of the minimum channel spacing $\Delta$ to one of the carriers of said two adjacent downstream signals.

It is preferable that the optical network units generate optical upstream signals whose optical carriers are associated to the received downstream signals.

The method is suited for bidirectional data transmission wherein the downstream signals and the upstream signals are transmitted via a single optical fiber. The frequencies of the downstream signals and the carriers of the upstream signals are chosen that reflected signals do not interfere with downstream signals and upstream signals respectively after converting said signals into electrical sub-band signals.

The method is further improved that subcarriers of the downstream signals and the carriers of the upstream signals are chosen that harmonic frequencies of the downstream signals and upstream signals do not interfere with the other signals after converting said signals into sub-band signals.

And it is advantageous that a continuous wave light source in the optical network unit is tuned for coherent demodulation and selection of an associated downstream signal and for determining the carrier frequency of an associated upstream signal.

The same upstream carrier frequency is used in an ONU for demodulating the associated received downstream signal and as carrier frequency for the ONU upstream signal.

The frequency distance between the carriers of a downstream signal and an upstream signal is preferable $\Delta$.

The generated optical upstream signals can be easily identified at the OLT.

It is advantageous to use subcarrier phase or phase difference modulation because of high receiver sensitivity and simplicity of upstream signal generation in the ONU.

According to the present invention, there is provided a method with the following steps:

in the central unit modulating a first group of signals onto a first group of subcarriers, combining modulated subcarrier signals of the first group, modulating a second group of signals onto a second group of subcarriers combining modulated subcarrier signals of the second group, generating a lower optical single sideband signal comprising an optical carrier and a first group of downstream signals, generating an upper optical single sideband signal comprising the same optical carrier and the second group of downstream signals, combining both single sideband signals to a transmission signal with a resulting 180° phase-difference of their optical carrier signals, transmitting the transmission signal to the network units, and selecting and demodulating associated downstream signals in the optical network units.

This kind of modulation reduces the costs of implementation and spectral and power efficiency is enhanced by the combination of single sideband signals with a suppressed optical carrier.

There is also provided a preferable embodiment for transmitting signals in a point to multipoint network between a central unit and a plurality of network units over a single optical fiber, comprising in a modulation unit of an OLT transmitter a first group of sub-band modulators modulating data signals onto a first group of electrical subcarriers, a first combiner combining modulated subcarrier signals to a first sub-band, a second group of sub-band modulators modulating data signals onto a second group of electrical subcarriers, a second combiner combining modulated subcarrier signals to a second sub-band, a first single sideband modulator receiving said first sub-band for modulating an optical carrier and generating a first single sideband signal, a second single sideband modulator receiving said second sub-band for modulating the optical carrier and generating a second single sideband signal, a delay element generating a 180° phase shift between the carriers of the single sideband signals, and an adder combining both single sideband signals to a transmission signal.

The generation of single sideband signals comprising a plurality of subcarrier signals reduces the technical efforts. Also the generation and combination of two single sideband signals and the elimination of the optical carriers without any optical filter reduces the costs.

According to technical restrictions of the hybrids it might be necessary to apply a plurality of hybrids for separate executing a Hilbert transformation of each data signal and further combiners for combining equal phase components of the data signals.

Other features which are considered as characteristic for the invention are set forth in the appended claims.

Although the invention is illustrated and described herein as embodied in a method and arrangement for transmitting signals in a point to multipoint network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 shows an embodiment for generation of subcarrier and modulation signals in the OLT transmitter, FIG. 6 shows an improved OLT optical modulation unit, FIG. 7 shows a frequency diagram for bidirectional data transmission via a single fiber.

DETAILED DESCRIPTION OF THE INVENTION

Figure 1:
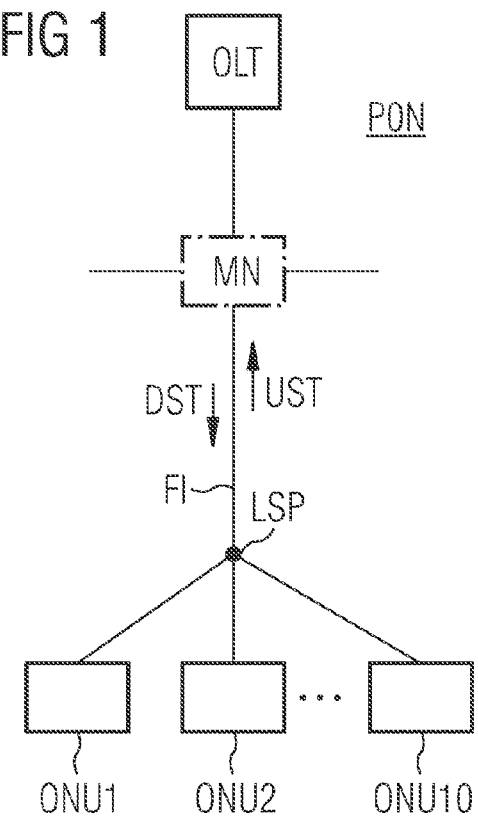
FIG. 1 shows a simplified bloc diagram of a PON system.

Referring now to the figures of the drawing in detail and first, particularly, to FIG. 1 thereof, there is shown a passive optical network PON, representing an example of a point to multipoint network. A central unit OLT (optical line terminal) is connected directly or via a metro network MN to a plurality of optical network units ONU1-ONU10. The ONUs are connected via a line-splitter LSP to a commonly used optical fiber FI. One or two optical fibers FI are usually used for bidirectional data transmission between the OLT and each ONT. The ONUs communicate with each other via the OLT.

Figure 2:
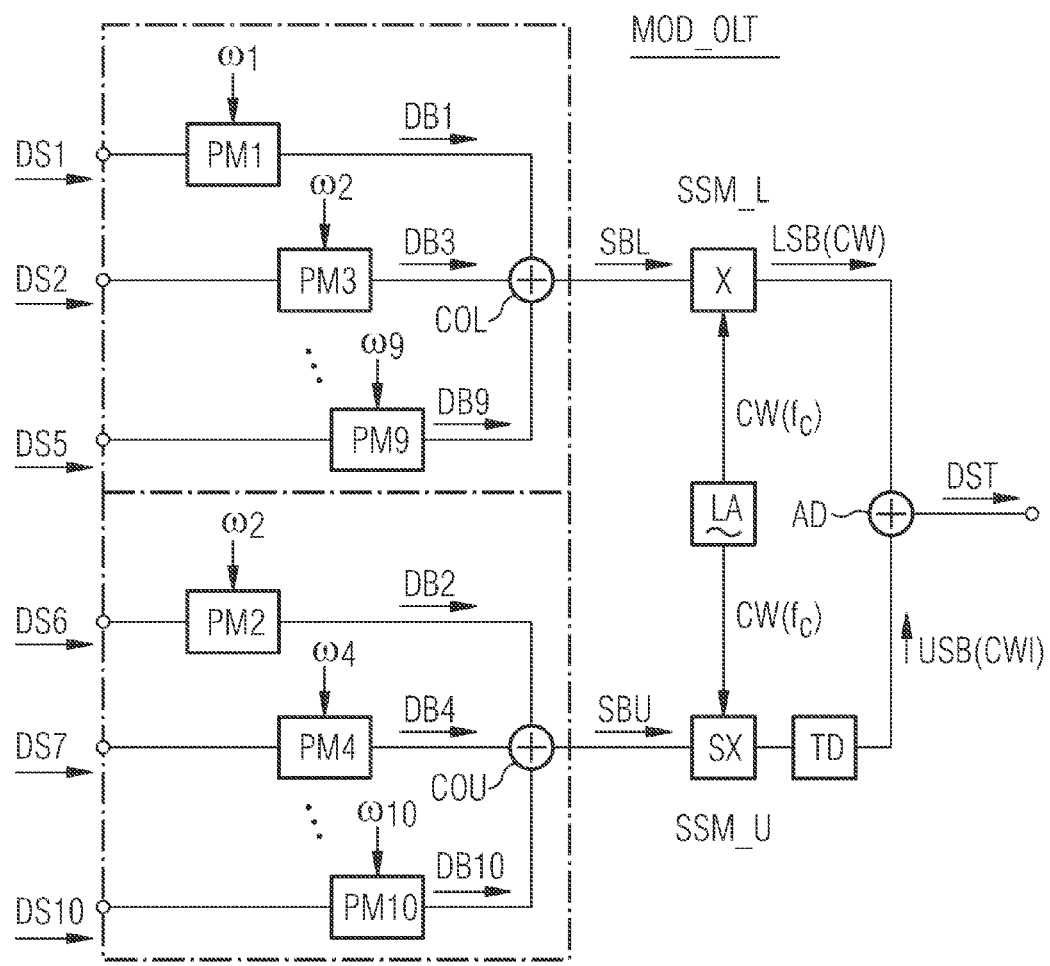
FIG. 2 shows a simplified embodiment of an OLT transmitter according to the invention.

FIG. 2 shows a modulation unit MOD_OLT of an OLT transmitter including subcarrier modulators, e.g. phase modulators PM1-PM10, a continuous wave source LA, and two single sideband modulators SSM_L and SSM_U. A first group of data signals DS1-DS5 is modulated onto subcarriers $\omega_1, \omega_3, \ldots, \omega_9$. The modulated subcarriers signals DB1, DB3, ..., DB9 are combined by a power splitter or a wavelength division multiplexer COL and a resulting lower subcarrier-band SBL fed to the first single sideband modulator SSM_L. A second group of data signals DS6-DS10 is modulated onto subcarriers $\omega_2, \omega_4, \ldots, \omega_{10}$. The modulated subcarriers signals DB2, DB4, ..., DB10 are combined by a combiner COU, and the upper subcarrier-band SBU is fed to the second single sideband modulator SSM_U.

An optical carrier signal CW (carrier frequency $f_C$) is generated by the continuous wave source (laser) LA and fed to both single sideband modulators. The optical single sideband modulators SSM_L and SSM_U generate different single sideband signals, a lower sideband signal LSB comprising the odd subcarrier signals and an upper sideband signal USB comprising the even subcarrier signals. One sideband signal e.g. USB is delayed (phase shifted) about 180° of the carrier signal by a (tunable) delay line or a phase shifter TD. Then both sidebands are combined in an adder (power splitter) AD to a double sideband transmission signal DST. Important is the phase difference of 180° between the carriers CW and CWI of the two sideband signals which reduces the carrier power to substantially zero.

Figure 3:
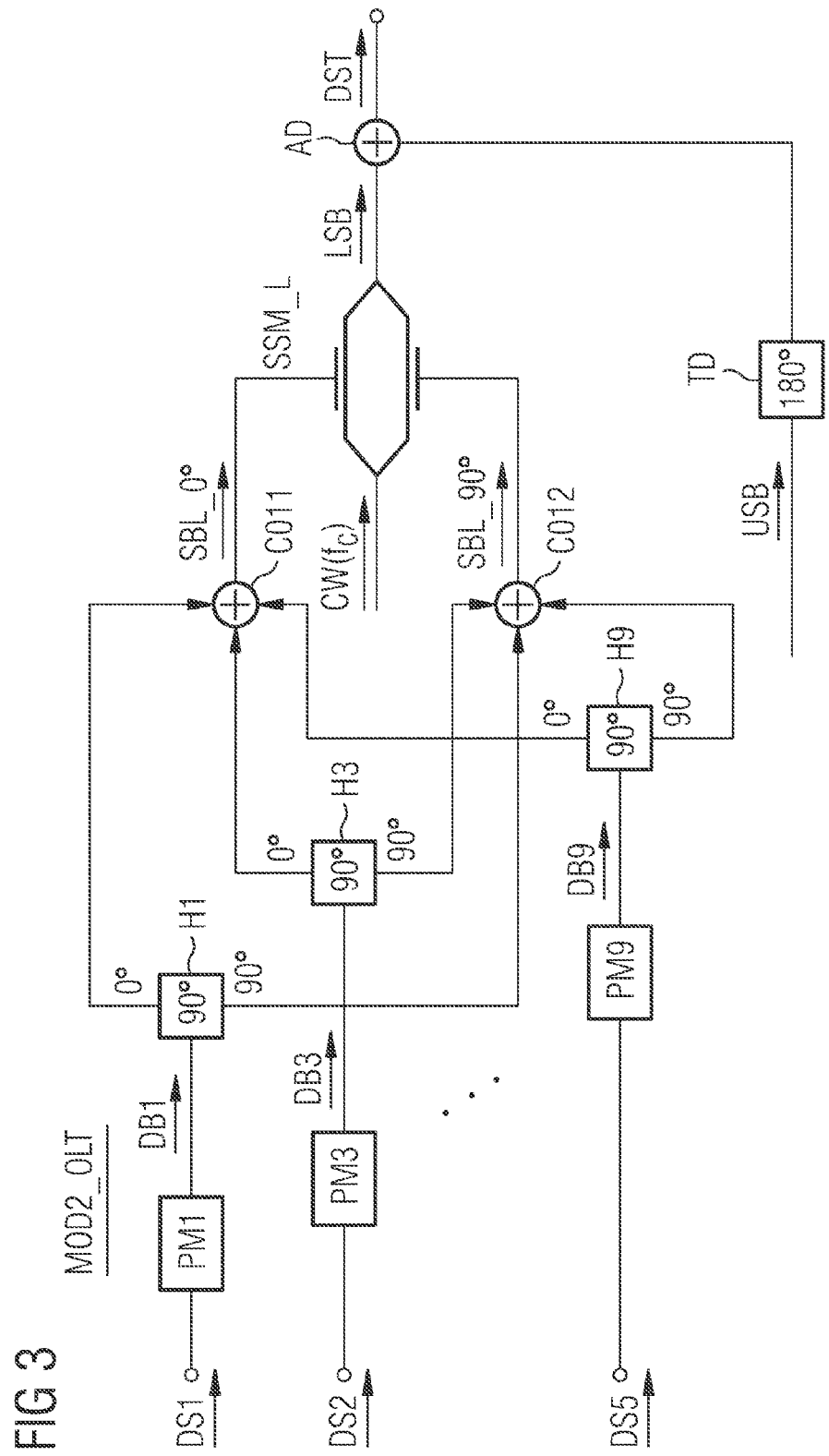
FIG. 3 shows a second embodiment of an OLT transmitter.

FIG. 3 shows a second embodiment of a modulation unit MOD2_OLT using individual subcarrier hybrids H1, H3, .... Only the arrangement for generation of the lower sideband LSB is illustrated. Modulation signal components SBL_0° and SBL_90° with a phase shift of 90° are derived from the modulated subcarrier signals DB1-DB9 according to the Hilbert transformation. All modulation signals with the same phase components are combined by two further combiners COM11 and COM12. The resulting sub-band signal components SBL_0° and SBL_90° represent the lower subcarrier band SBL. Both resulting modulation signal components SBL_0° and SBL_90° are fed as modulation signals SBL_0° and SBL_90° to the first single sideband modulator SSM-L for modulating the carrier signal CW.

The single sideband modulator has a Mach-Zehnder-Interferometer structure. A necessary phase difference between the optical carrier signals in the lower and upper branch of the single sideband modulator is e.g. achieved by different bias voltages.

The upper sub-band SBU is generated in an identical arrangement and added to the lower sideband by the adder AD.

Of course, all common methods of generating single sideband signals may be applied. Regarding this invention, it is important that the optical carriers of both single sideband modulators are supplied by the same continuous wave light source, mostly a laser source, and added with a phase difference of 180°. This results in a cancellation of the optical carrier, so that the energy of the signal is contained only in the parts of the spectrum which carry information, whereas for usual modulation with a low modulation index most of the energy would be contained in the carrier.

FIG. 4 illustrates a further OLT modulation unit MOD3_OLT for generating the electrical subcarriers and modulation signals. The data signals DS1-DS10 are first modulated onto subcarriers derived from a common electrical subcarrier signal $\omega_{EC}$ by the modulators PM1-PM10. The modulated signals are then fed to further modulators M1-M10 (mixers, multipliers or frequency converters) and converted by applying different conversion signals $\omega_{CO1-10}$. The subcarrier signals DB1-DB10 are output from the filters FI1-FI10. The combiners COL and COU combine the subcarrier signals as described before. The hybrids HL and HU receive the subcarrier bands and output phase shifted modulation signals I, Q according to the Hilbert transformation.

Figure 5:
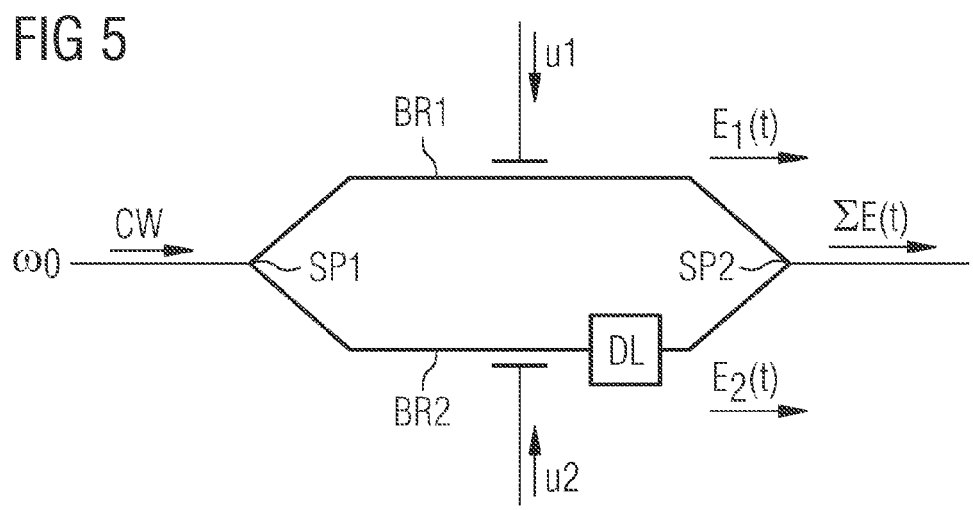
FIG. 5 shows a simplified diagram of an optical modulator.

FIG. 5 shows a simplified embodiment of an optical modulator with a first splitter SP1 receiving a continuous wave signal CW, two optical branches BR1, BR2 controlled by electrical modulation signals u1, u2, and a second splitter SP2 (combiner) combining the modulated optical signals of both branches.

The lower branch BR2 comprises a delay line DL for correct phase adjustment. A phase shift by a time delay is also achieved by applying different bias voltages.

The function of the single sideband modulator driven by SBL_0° and SBL_90° is now derived in general form. The index k refers to the signals of a single sideband.

With m—modulation index (ca. <0.06 for N=10), ω—baseband angular frequencies, s—modulation signal (symbols), t—time:

The resulting modulation signal in the upper branch BR1 is:

$$u1 = m \times \sum_{k=1}^{N} \cos(\omega_k t + s_k(t)) \quad (1)$$

in the lower branch BR2:

$$u2 = m \times \sum_{k=1}^{N} \sin(\omega_k t + s_k(t)) + \theta \quad (2)$$

The electrical field of the continuous wave light from the laser source is (setting the amplitude to 1 for simplicity):

$$E = \cos(\omega_c * t) \quad (3)$$

Therefore we get in the upper branch BR1:

$$E_1(t) = \cos\left[\omega_c t + m \times \sum_{k=1}^{N} \cos(\omega_k t + s_k(t))\right] \quad (4)$$

and in branch 2:

$$E_2(t) = \cos\left[\omega_c t + m \times \sum_{k=1}^{N} \sin(\omega_k t + s_k(t)) + \theta\right] \quad (5)$$

with =90° we get:

$$E_2(t) = -\sin\left[\omega_c t + m \times \sum_{k=1}^{N} \sin(\omega_k t + s_k(t))\right] \quad (6)$$

Using the Addition Theorems $$\cos(x+y) = \cos(x)\cos(y) - \sin(x)\sin(y) \quad (7)$$

$$\sin(x+y) = \sin(x)\cos(y) + \cos(x)\sin(y) \quad (8)$$

we get in branch 1

$$E_1(t) = \cos[\omega_c t] \times \cos\left[m \times \sum_{k=1}^{N} \cos(\omega_k t + s_k(t))\right] - \sin[\omega_c t] \times \sin\left[m \times \sum_{k=1}^{N} \cos(\omega_k t + s_k(t))\right] \quad (9)$$

exactly, and by small signal approximation (m<<1):

$$E_1(t) \approx \cos[\omega_c t] - \sin[\omega_c t] \times m \times \sum_{k=1}^{N} \cos(\omega_k t + s_k(t)) \quad (10)$$

In the lower branch BR2 we get $$E_2(t) = \sin[\omega_c t] \times \cos\left[m \times \sum_{k=1}^{N} \cos(\omega_k t + s_k(t))\right] + \cos[\omega_c t] \times \sin\left[m \times \sum_{k=1}^{N} \sin(\omega_k t + s_k(t))\right] \quad (11)$$

exactly, and by small signal approximation (m<<1):

$$E_2(t) \approx \sin[\omega_c t] + \cos[\omega_c t] \times m \times \sum_{k=1}^{N} \sin(\omega_k t + s_k(t)) \quad (12)$$

The superposition of the fields (small signal approximation) results in:

$$E_1(t) + E_2(t) \approx \cos[\omega_c t] + \sin[\omega_c t] + \quad (13)$$

$$m \left\{ \cos[\omega_c t] \times \sum_{k=1}^{N} \sin(\omega_k t + s_k(t)) - \sin[\omega_c t] \times \sum_{k=1}^{N} \cos(\omega_k t + s_k(t)) \right\}$$

with $\cos(x)\sin(y) = \frac{1}{2}[\sin(x-y) - \sin(x+y)]$ and $\sin(x)\cos(y) = \frac{1}{2}[\sin(x-y) + \sin(x+y)]$ we get:

$$\Sigma E(t) \approx \cos[\omega_c t] + \sin[\omega_c t] + \quad (14)$$

$$1/2m \left\{ \sum_{k}^{N} \sin[(\omega_c - \omega_k)t - s_k(t)] - \sin[(\omega_c + \omega_k)t + s_k(t)] - \right.$$

$$\left. \sin[(\omega_c - \omega_k)t - s_k(t)] - \sin[(\omega_c + \omega_k)t + s_k(t)] \right\}$$

Therefore we get a phase modulated wave at the upper angular frequencies $\omega_c + \omega_k$ with a modulation $s_k(t)$. The carrier is $\sqrt{2}\sin[\omega_c t + \pi/4)]$ and the modulated part of the E-field is:

$$\Delta\Sigma E(t) \approx -m \left\{ \sum_{k=1}^{N} \sin[(\omega_c + \omega_k)t + s_k(t)] \right\} \quad (15)$$

In case of θ=270° we get a phase modulated wave with modulation $s_k(t)$ at lower angular frequencies $\omega_c - \omega_k$.

FIG. 6 shows a OLT modulator arrangement MOA_OLT comprising two single-sideband modulators SSM_L and SSM_U.

The electrical subcarrier-bands SBL, SBU are both split into two 90° phase shifted signals, which comply with the modulation signals u1, u2.

Here the upper branch comprises the delay line TD causing a resulting carrier phase shift between the single sideband signals of 180°.

A power control element PC1 and a delay control PHC are inserted in the upper branch. The lower branch includes a second power control element PC2. Each optical modulator SSM_L and SSM_U comprises an additional correction electrode CE1, CE2, each receiving a correction signal SC1 and SC2 from a modulation control (not shown). The correction signals can also be added to the modulation signals.

According to (9) and (11), which describe exactly the signal generation without small signal approximation the output signals have $2^{nd}$ and higher order distortions. These distortions can be corrected in a first approximation by applying adequate correction signals derived from higher order expansion of the small signal approximation used for approximating (10) and (12).

$$SC \sim \left\{ \sum_{k=1}^{N} \cos(\omega_k t + s_k(t)) + \theta_k \right\}^2 \quad (16)$$

FIG. 7 shows a frequency diagram of the optical signals transmitted bidirectional via a single optical fiber. E.g. phase or phase difference phase modulation may be applied for downstream and/or upstream signals. The optical downstream signals D1-D10 of the downstream transmission signal DST carry the information of the subcarrier signals DB1-DB10. In this example only 10 signals are transmitted in the downstream direction and 10 signals U1-U10 in the upstream direction. According to FIG. 2 the downstream signals D1, D3, . . . of the lower sub-band carry odd numbers 1, 3, . . . , 9 and the downstream signals D2, D4, . . . of the upper side band carry even numbers 2, 4, . . . , 10. The associated upstream signals U1-U10 of an "upstream wavelength division multiplex transmission signal" UST are shown in the upper part. They are arranged near the associated downstream channels to allow an easy identification and for technical reasons, which will be explained later. The optical carrier frequency $f_C$ of the downstream transmission signal DST and the optical carrier frequencies $f_{Onu1}$-$f_{Onu2}$ of the upstream signals show the frequency relations of the signals. Reflected signals are indicated by horizontal lines.

A special channel spacing (frequency distance between adjacent channels) nΔ (n=3, 4) is chosen for two reasons.

Figure 9:
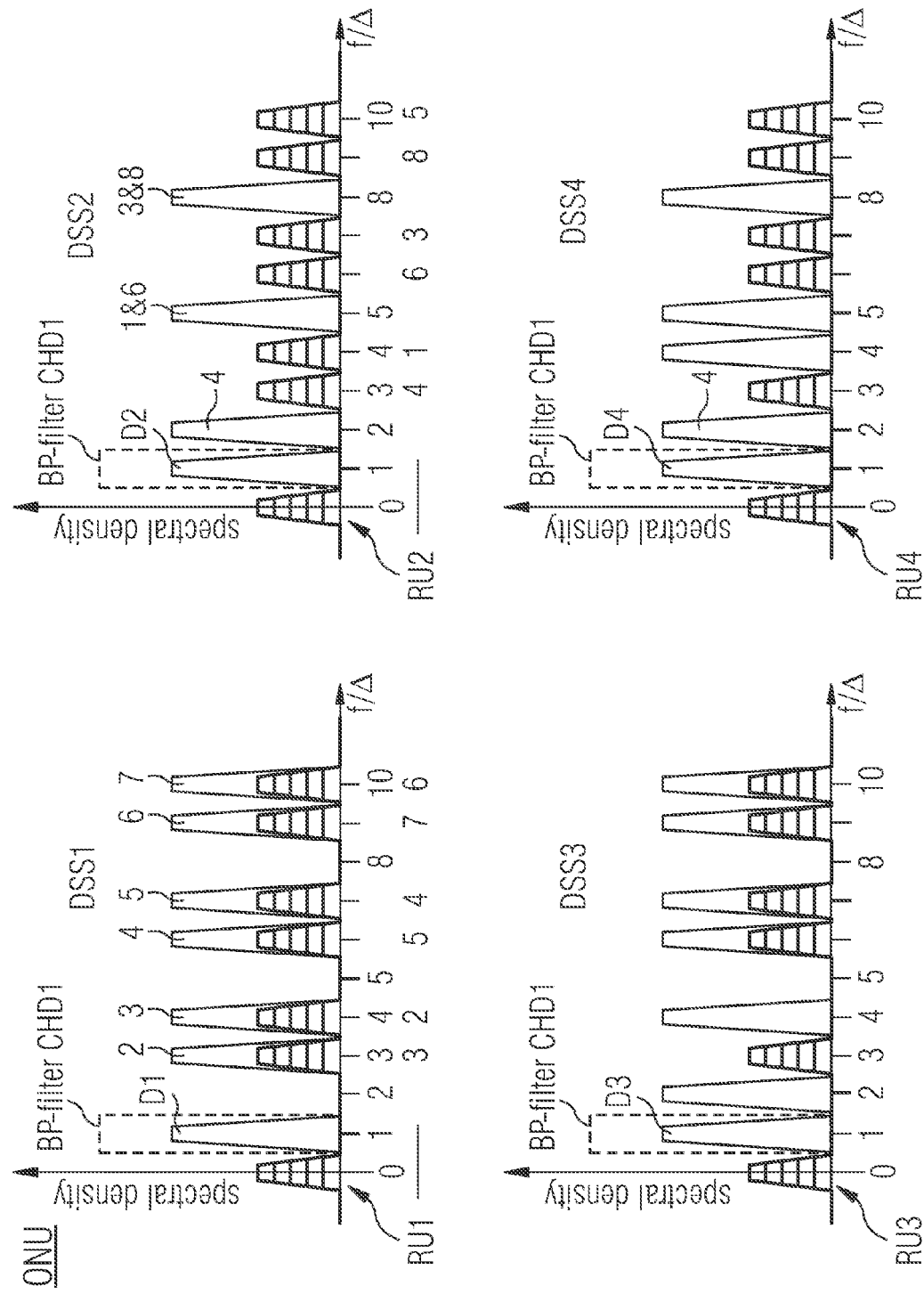
FIG. 9 shows sub-band frequency diagrams in the electrical domain for different ONUs.
Figure 11:
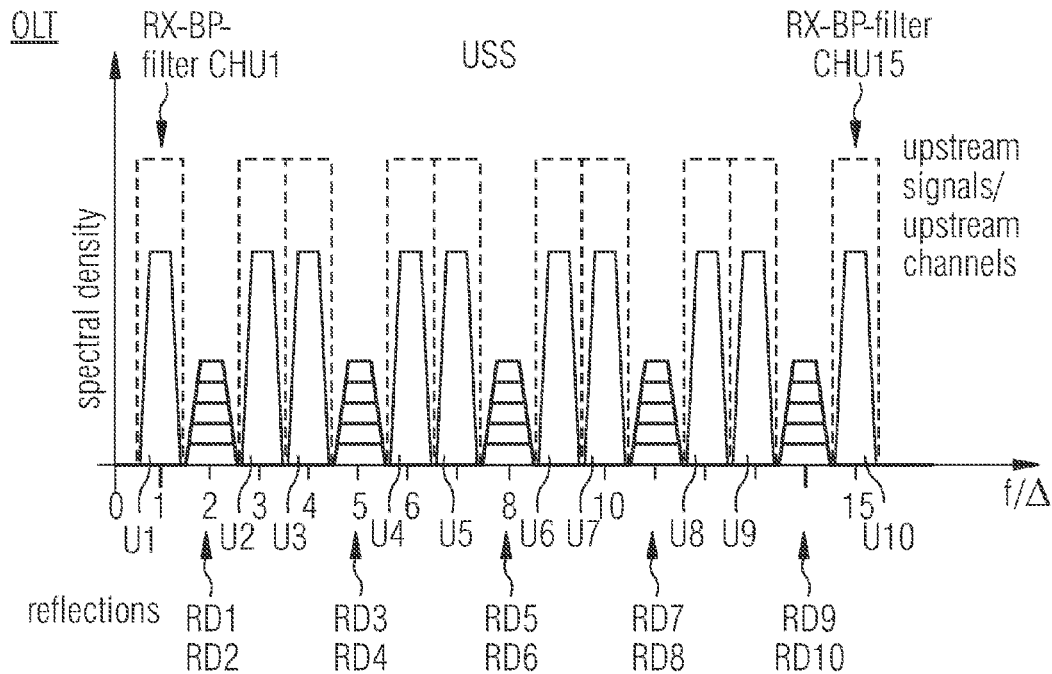
FIG. 11 illustrates a sub-band frequency diagram in the electrical domain for the OLT.

Firstly, to avoid impairments caused by reflections. Secondly, to avoid impairments caused by harmonic waves of the carriers of electrical sub-band signals (FIG. 9, FIG. 11). The downstream signals D1 and D2 and the upstream signals U1 and U2 have a frequency distance of 4Δ. Possible is also 6Δ, 8Δ, . . . . The spacing of all other channels to their neighbor channels, e.g. CH4 and CH6, is 3Δ (and 6Δ, 9Δ, 12Δ, . . . ) with a minimum Δ=(1.2–1.5) BW (BW–transmission signal DST bandwidth). If the channel spacing is greater than the minimum spacing 3Δ, 4Δ higher frequency tolerances of the channels can be accepted.

Figure 8:
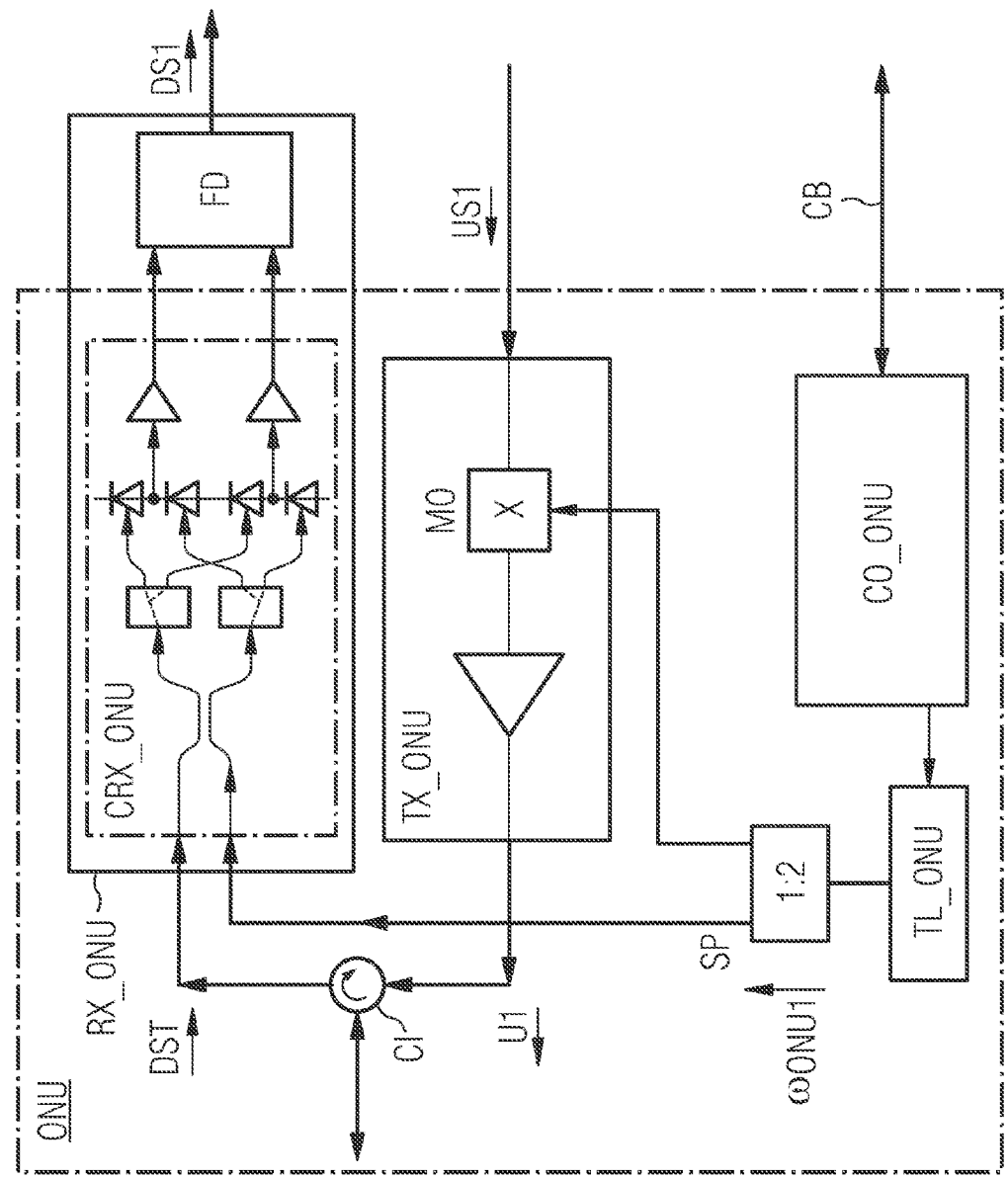
FIG. 8 shows a simplified embodiment of an ONU transceiver.

FIG. 8 shows a block diagram of an ONU transceiver RX_ONT comprising a balanced coherent polarization diversity receiver CRX for coherent demodulation, a tunable laser TL (continuous wave light source) and an ONU transmitter TX_ONU.

The coherent receiver is described in "Coherent receiver front-end module including a polarization diversity waveguide OIC and a high-speed InGaAs twin-dual p-i-n photodiode OEIC both based on InP" by Hamacher, M.; Heidrich, H.; Kruger, U.; Stenzel, R.; Bauer, J. G.; Albrecht, H. IEEE Photonics Technology Letters 4 (1992), Nr. 11, S. 1234-7; ISSN: 1041-1135.

The coherent polarization diversity receiver CRX_ONU converts the downstream transmission signal DST by overlaying the received signals independent of the polarization with a laser signal $\omega_{ONU}$. The received transmission signal is converted into an electrical downstream sub-band DSB. The laser frequency is tuned to a predetermined frequency, e.g. $f_{ONU1}$. Then a certain downstream signal e.g. D1 is converted into an electrical sub-signal, which frequency corresponds to a band-path frequency. The electrical downstream signal is selected by a filter and decision unit FD while other signals and components are blocked.

The modulation and amplification of an optical upstream signal, e.g. U1, is executed in an ONU transmitter TX_ONU. The same tunable laser signal $\omega_{ONU1}$ (respectively regarding all ONUs: carrier frequencies $f_{ONU1}$-$f_{ONU10}$) is fed to an optical modulator MO as a carrier signal, which is modulated by an upstream data signal US1. The optical upstream signals of the ONUs are combined by the splitter LSP (FIG. 1) to the upstream transmission signal UST.

A control unit CON_ONU controls the tunable laser TL. Therefore the ONU can be adapted to each downstream channel by control information received via a control bus CB. The laser frequency could be higher or lower than the optical carrier frequency of the selected signal. In both cases it is possible to use the same laser signal, divided by a splitter SP, for the receiver and the transmitter.

FIG. 9 illustrates four electric sub-band spectra of ONU1-ONU4. The spectral intensity is depicted as a function of the frequency/channel spacing VA. Regarding the first ONU 1 (top left) the received downstream transmission signal DST is converted into a downstream sub-band DSS1 (electrical signal spectra; top left). The designations D1-D10 of the downstream signals are also used for electrical sub-band signals in ONU receives. The first optical downstream signal D1 corresponds after conversion into an electrical sub-band signal to a first sub-band downstream channel CHD1 and is selected by a band-path filter BP; all other downstream signals of both side-bands and the reflected portions RU1-RU10 of the upstream signals U1-U10 are blocked by the bandpath filter. The other FIG. 9 diagrams show the electrical sub-band spectra of downstream sub-bands DSS2-DSS4. These different spectra result by converting the received downstream signals in the ONU2-ONU4 with different frequencies $f_{ONU2}$-$f_{ONU10}$ (FIG. 6). The selected signals are here always associated to the same downstream sub-band channel CHD1. The received downstream signals are converted into similar sub-band signals in all further ONUs. Only the first 10 channels (correspond to the f/$\Delta$ numbers) are shown in these diagrams for reasons of clarity.

Figure 10:
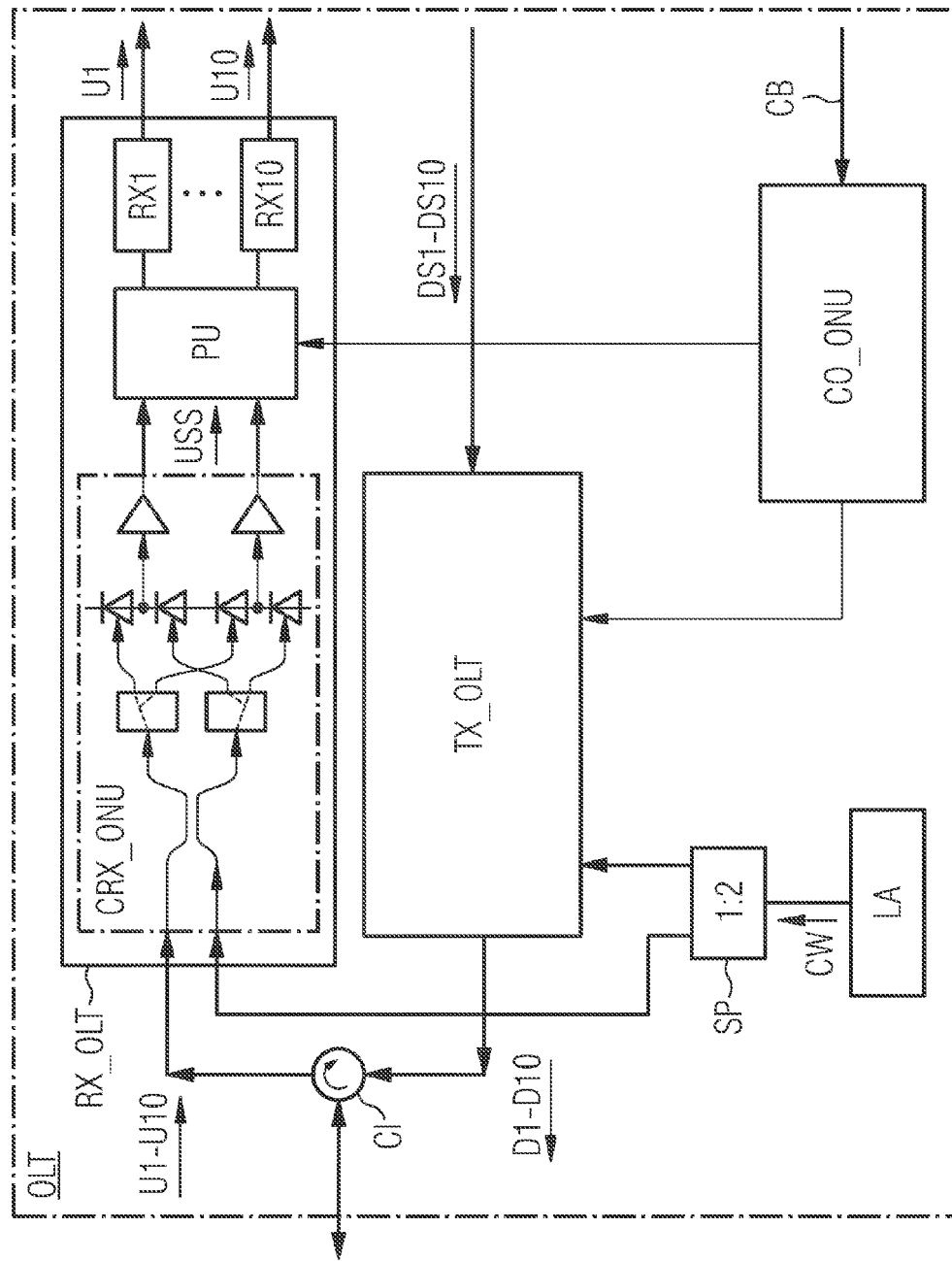
FIG. 10 shows a simplified embodiment of an OLT transceiver.

FIG. 10 shows a simplified embodiment of an OLT comprising a receiver RX_OLT and a transmitter TX_OLT. The received upstream signals U1-U10 of the upstream transmission signal UST are also converted into electrical upstream sub-band signals USS by a balanced coherent polarization diversity receiver CRX_ONT. The optical OLT carrier signal CW is also used for this conversion. The electrical upstream sub-band signals U1-U10 are then separated (e.g. by filters after mixing with an electrical signal) in a processing unit PU and fed to separate digital receivers RX1-RX10 for regaining the upstream data signals US1-US10.

The OLT transmitter TX_OLT comprises basically an already described modulation unit and an amplifier.

FIG. 11 shows the electrical spectrum of the received upstream signals at the OLT after conversion into an electric upstream sub-band USS. The designations U1-U10 of the upstream signals are also used for electrical signals of the OLT sub-band. All reflected portions RD1-RD10 of the downstream signals fall between the upstream sub-band signals USS (corresponds to U1-U10). The upstream sub-band signals USS received in sub-band channels CHU1, 3, 4, 6, ..., CHU15 are separated e.g. by different RX-BP-filters of the processing unit.

Figure 12:
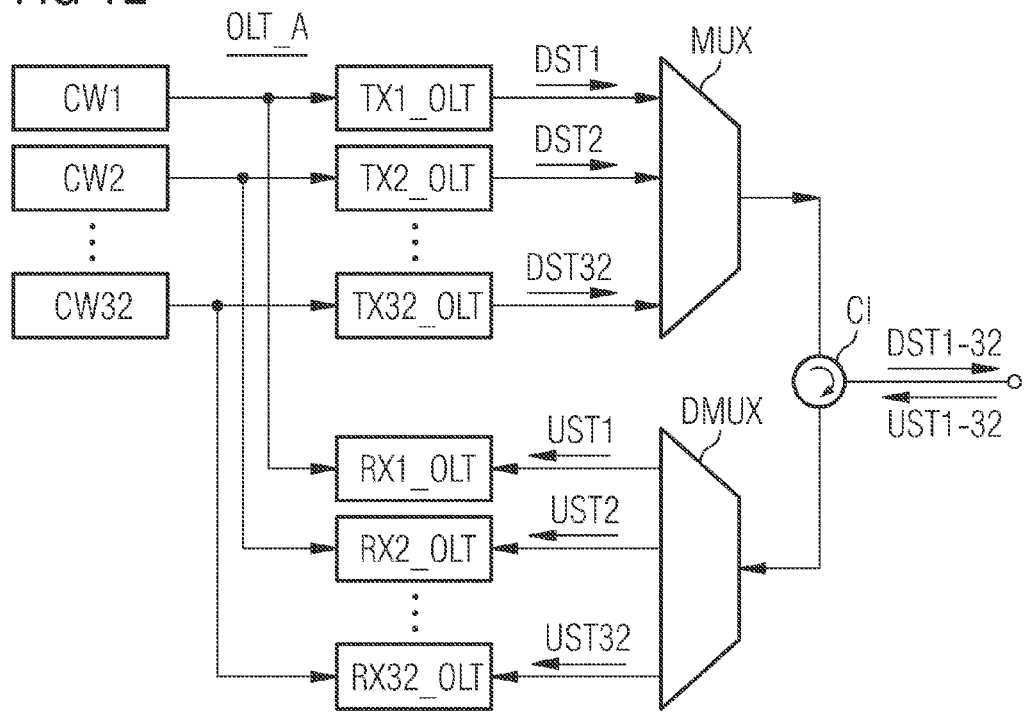
FIG. 12 illustrates an embodiment of an advanced OLT.

FIG. 12 shows an embodiment of the OLT_A for an advanced network. Because the number of channels per CW is limited for physical reasons a plurality of transmitters TX1_OLT-TX32_OLT, each generating a double sideband transmission signal DST1-DST32, is arranged in the OLT. The output signals DST1-DST32 are combined by a wavelength division multiplexer MUX and transmitted via a circulator CI.

A received upstream wavelength division multiplex signal UST1-UST32 is output from the circulator CI and demultiplexed by a wavelength division demultiplexer DMUX into subcarrier multiplex transmission signals UST1-UST32. Each of these transmission signals is coherently demodulated in an OLT receiver RX_OLT1-RX_OLT32 and converted into an electrical upstream sub-band (e.g. USS, FIG. 11). The upstream signals are then separated and output or transmitted to another ONU respectively.

The present invention is not limited to the details of the above described principles. The scope of the invention is defined by the appended claims and all changes and modifications as fall within the equivalents of the scope of the claims are therefore to be embraced by the invention. Especially analog data processing can be substituted by digital data processing when high speed processors are available for a reasonable price.

The invention claimed is:

1. A method for transmitting optical downstream signals and optical upstream signals via a single optical fiber in a point to multipoint network between a central unit and a plurality of network units, the method which comprises:
generating an optical downstream transmission signal formed of downstream signals with a channel spacing of $2n\Delta$, where n=2, 3, 4, ..., between two adjacent downstream signals and a channel spacing of $3\Delta$ between all other adjoining downstream signals;
where $\Delta$ is a minimum channel spacing.

2. The method according to claim 1, wherein the two adjacent downstream signals are generated with a channel spacing of $4\Delta$.

3. The method according to claim 1, which comprises generating an optical carrier signal for signal processing in the central unit with a carrier frequency located at the center of the interval between said carrier frequencies of the two adjacent downstream signals.

4. The method according to claim 1, wherein:
the optical network units generate carriers of the optical upstream signals;
each optical carrier of an upstream signal is dedicated to a carrier of an associated downstream signal; and
is also used for demodulating and selecting the associated downstream signal.

5. The method according to claim 4, which comprises transmitting the upstream signals with a same channel spacing as the associated downstream channels.

6. The method according to claim 4, wherein the optical network units generate the optical upstream signals whose optical carriers have a frequency distance of $\Delta$ to the carrier frequency of the associated downstream signal.

7. The method according to claim 1, which comprises tuning a continuous wave light source of the optical network unit for demodulation and selection of an associated downstream signal and for determining the carrier frequency of the associated upstream signal.

8. The method according to claim 1, which comprises coherently demodulating the received optical downstream signals in the optical network units.

9. The method according to claim 4, wherein in the central unit the optical upstream signals are converted into electrical subcarrier signals using the optical carrier signal.

10. The method according to claim 1, which comprises:
generating the downstream transmission signal as single sideband signal by subcarrier modulation; and
suppressing an optical carrier of the single sideband signal.

11. The method according to claim 10, which comprises:
generating a first group of subcarrier signals with subcarriers modulated by a first group of data signals;

combining the first group of subcarrier signals to a lower subcarrier band;
generating a second group of subcarrier signals with further subcarriers modulated by a second group of data signals;
combining the second group of subcarrier signals to an upper subcarrier band;
modulating the optical carrier signal with the lower subcarrier band generating a lower optical single sideband signal comprising the optical carrier signal and a first group of downstream signals;
modulating the optical carrier signal with the upper subcarrier band generating an upper optical single sideband signal comprising the optical carrier signal and a second group of downstream signals;
combining both single sideband signals with a resulting 180° phase difference between their optical carriers signals to the downstream transmission signal.

12. The method according to claim 1, which comprises applying two or multiple phase or phase difference modulation.

13. The method according to claim 10, which comprises applying correction signals to single sideband modulators for reducing $2^{nd}$ and higher order distortions.

14. An arrangement for transmitting signals in a point to multipoint network between a central unit and a plurality of network units over a single optical fiber, comprising:
in an OLT transmitter
a modulation unit for generating a first group of subcarrier signals with electrical subcarriers modulated by a first group of data signals, and for generating a second group of sub-carrier signals with electrical subcarriers modulated by a second group of data signals modulating data signals;
a first combiner for combining a modulated first group of subcarrier signals to a lower subcarrier-band;
a second combiner for combining a modulated second group of subcarrier signals to an upper sub-band;
a first single sideband modulator for receiving the lower subcarrier-band for modulating an optical carrier and generating a first single sideband signal;
a second single sideband modulator for receiving the upper sub-band for modulating the optical carrier and generating a second single sideband signal; and
an adder combining the first and second single sideband signals to a downstream transmission signal generating an optical downstream transmission signal comprising downstream signals with a channel spacing of 2nΔ between two adjacent downstream signals and a channel spacing of 3Δ between all other adjoining downstream signals;
where Δ is a minimum channel spacing.

15. The arrangement according to claim 14, wherein said modulation unit comprises:
a delay element generating a 180° phase difference between the carriers of the single sideband signals for suppressing the optical carrier.

16. The arrangement according to claim 14, wherein said modulation unit comprises:
a first group of sub-carrier modulators modulating the first group of data signals onto the first group of electrical subcarriers; and
a second group of sub-carrier modulators modulating the second group of data signals onto the second group of electrical subcarriers.

17. The arrangement according to claim 14, wherein said modulation unit comprises:
a first group of sub-carrier modulators modulating the data signals onto subcarriers derived from a common electrical subcarrier;
a second group of sub-carrier modulators modulating the data signals onto said subcarriers derived from said common electrical subcarrier;
further modulators connected to outputs of said subcarrier modulators, each of said further modulators receiving a conversion signal; and
filters connected in series with said further modulators outputting the subcarrier signals.

18. The arrangement according to claim 14, comprising hybrids for generating modulation signals by executing a Hilbert transformation of the sub-bands.

19. The arrangement according to claim 14, wherein said modulation unit comprises:
a first group of sub-carrier modulators modulating a first group of data signals onto a first group of electrical subcarriers;
a plurality of hybrids for executing a Hilbert transformation of generated subcarrier signals; and
further combiners combining equal phase components of the subcarrier signals to modulation signals of a lower single sideband; and
corresponding means for generating modulation signals for an upper single sideband.

20. The arrangement according to claim 14, wherein each single sideband modulator has a Mach-Zehnder structure and includes an additional control electrode receiving a correction signal.

21. The arrangement according to claim 14, wherein the central unit comprises an OLT receiver receiving upstream signals and outputting upstream data signals, including an coherent polarization diversity receiver, a processing unit connected in series separating the received upstream channels, and digital receivers.

22. The arrangement according to claim 14, comprising, in an optical network terminal:
an ONU receiver including a coherent polarization diversity receiver receiving the downstream signals;
a filter and decision unit connected in series selecting one downstream signal;
a continuous wave light source outputting a continuous wave signal, which is fed to the coherent polarization diversity receiver, and as a carrier signal;
a transmitter unit including an optical modulator modulating an upstream data signal onto said carrier signal generating an optical upstream signal.

23. The arrangement according to claim 22, wherein said continuous wave light source is a tunable laser, and said laser is tuned for selecting an associated downstream signal.

24. An advanced optical line terminal, comprising a plurality of OLT transmitters according to claim 14 and a plurality of OLT receivers.

* * * * *